June 30, 1953 G. W. FYLER 2,644,105

TELEVISION CIRCUIT

Filed Jan. 30, 1952

INVENTOR.
George W. Fyler
BY
Foorman L. Mueller
Attys.

Patented June 30, 1953 2,644,105

UNITED STATES PATENT OFFICE 2,644,105

TELEVISION CIRCUIT

George W. Fyler, Lombard, Ill., assignor to Motorola, Inc., Chicago, Ill., a corporation of Illinois Application January 30, 1952, Serial No. 269,049

12 Claims. (Cl. 315—27)

The present invention relates to electronic amplifier circuits and more particularly to an improved form of such amplifier circuit adapted to provide sawtooth current waves for use in the vertical deflection systems of magnetically deflected cathode ray tubes in television receivers or the like.

Deflection circuits for television receivers using magnetically deflected cathode ray picture tubes must be able to supply relatively high deflection currents of sawtooth waveform and of straight line linearity. That is to say, the deflection signal through the deflection coils must be a current having a sawtooth waveform and a linear current rise with time. The output circuits necessary to obtain such deflection signals are generally comprised of a power output tube of the grid controlled type and an output transformer. An exciting input signal having a linear sawtooth voltage waveform, when applied to the control grid of the output tube, does not ordinarily produce a corresponding linear sawtooth waveform of current in the deflection coils because the power output tube tends to have positive non-linear curve characteristics, and the output transformer tends to have negative non-linear characteristics which do not equally offset each other under normal conditions.

Prior to this invention, a linearity control of the waveform of the output current has been obtained by using a power output tube of much greater capabilities than actually required for the desired deflection output current, and then providing an adjustable bias for the tube so that the points of tube operation on its characteristic response curve can be shifted until its positive characteristics more nearly correspond to the negative characteristics of the transformer. Of course, the change in bias for the output tube has the effect of varying the amplification of the power output tube circuit so that such arrangements for obtaining a control of linearity are disadvantageous in that the amplitude of the deflection signal is changed as the linearity is adjusted. The vertical deflection circuits of television receivers are particularly troublesome in regard to the above described problems of linearity.

Furthermore, in the bias type of linearity control previously used, the change in plate current also affects the degree of saturation and the inductance of the output transformer. This means that while the second harmonic current can be canceled, a wide variation in third harmonic current occurs within the practical tolerances of tubes and output transformers.

An object of the invention is to provide a deflection power output circuit particularly adapted for use in the vertical deflection system of a television receiver and having an improved linearity control circuit enabling the use of low power output tubes.

It is another object of the present invention to provide an improved deflection power output circuit having a linearity control that is effective without producing wide variations in amplitude of the deflection output signal.

Another object of this invention is to provide means for canceling both second and third harmonic non-linearity in vertical sweep amplifier systems to thereby maintain a uniformly better linearity in quantity production.

A feature of the invention is the provision of a linearity control for a sweep power output stage which provides for a simultaneous change of negative bias for the tube together with a corresponding change of degenerative feedback in the output stage such that the linearity may be altered without appreciable change in vertical size. The controlled degeneration for the power output tube is obtained by a feedback connection in the cathode circuit of the output tube.

A further feature of this invention is the provision of a sweep output stage including a bias and feedback circuit for providing linear sweep, with a potentiometer providing adjustable bias and degeneration for correcting second harmonic distortions and a fixed bias resistor for holding the operating point of the output tube within a relatively small range.

Further objects, features, and the attending advantages of the invention will be apparent with reference to the following specification and drawings, in which.

In practicing the invention, the vertical deflection power amplifier circuit is provided with a grid controlled power amplifier tube having cathode connections providing for adjustable cathode bias together with simultaneously adjustable degenerative feedback in a manner to provide increased degenerative feedback with decreased bias and vice versa. In such arrangement the changes in linearity may be obtained without substantial changes in amplitude. The provision of a properly selected fixed resistor for providing fixed bias in series with the adjustable bias will hold the operation of the tube close to a fixed point and this is effective to eliminate third harmonic distortion.

Figure 1:
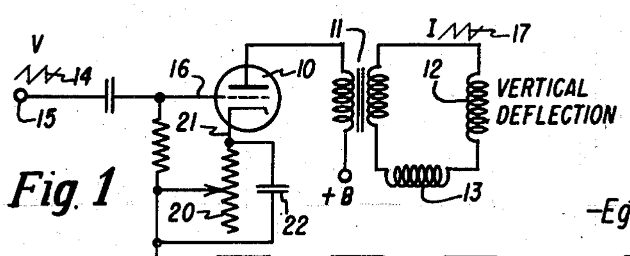
Fig. 1 is a schematic diagram of a known form of linearity control for a vertical deflection output circuit.
Figure 2:
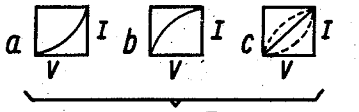
Fig. 2 shows a series of representative curves for the positive and negative characteristics of the output tube and transformer together with their combined characteristics respectively.
Figure 3:
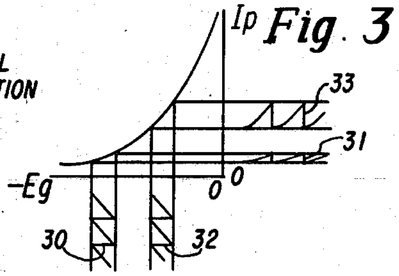
Fig. 3 is a tube dynamic characteristic curve showing the results obtained with the conventional linearity circuit of Fig. 1.

For a more detailed understanding of the invention reference is made to the drawings, wherein Figs. 1, 2 and 3 illustrate the operation of a known form of linearity control for a vertical deflection power output stage which will be described somewhat in detail in order to emphasize the improvements of the present invention. This form of vertical deflection power output stage may be comprised of a triode vacuum tube 10, vertical deflection coils 12 and 13 connected as shown. A sawtooth voltage input signal 14 is applied across the terminal 15 and ground to the control grid 16 of the power amplifier tube 10. The amplification of tube 10 is effective to produce a generally sawtooth waveform of deflection current 17, in the output circuit of the output transformer 11 including the vertical deflection coils 12 and 13. As shown by the curve *a* of Fig. 2, the power amplifier tube 10 tends to have a positive output characteristic of current with respect to voltage input, while as shown in curve *b*, the output transformer 11 tends to have a negative characteristic of current output for input. As shown in curve *c*, the positive characteristic of the tube in curve *a* may be combined with or balanced by the negative characteristic of the transformer in curve *b* to produce a linear current waveform in which the current rise is uniform or linear.

In the mass produced television receiver it is not possible to accurately predetermine the positive characteristics of the power amplifier to be exactly opposite to the negative characteristics of the vertical deflection output transformer. Therefore, a linearity control is provided to obtain proper matching of the tube characteristics and transformer characteristics. In the conventional prior art circuit of Fig. 1, such linearity control is obtained by means of a variable bias resistance 20 connecting the cathode 21 of the deflection power output tube 10 to ground. A bypass condenser 22 is provided for directly returning the deflection signal to ground. By adjusting the variable bias resistance 20 the operating position of the power output tube 10 with respect to its operating characteristic is shifted to change its positive characteristic to more clearly match the negative characteristic of the vertical output transformer. This function will be clearly understood by reference to Fig. 3 of the drawings, which is representative of a dynamic characteristic operational curve for the vertical deflection power output tube 10. The voltage input signal 30 of sawtooth waveform is effective when the tube is operating under a first condition of bias to produce the sawtooth current waveform 31 which it will be seen is quite non-linear and also of quite small amplitude. By adjusting the variable bias resistance 20 and changing the tube bias to shift its operating position of the curve of Fig. 3, it will be seen that the input signal 32 of sawtooth voltage waveform having an amplitude equal to the input signal 30 produces a corresponding sawtooth waveform of current output 33. It will be immediately noted that the sawtooth current waveform 33 is of considerably greater amplitude than the sawtooth current waveform 31, and is also of different linearity. It should thus be apparent that the use of the linearity control of Fig. 1, while it may be effective to obtain the desired matching of positive tube characteristic and negative transformer characteristic, also produces a corresponding disadvantageous result in that the amplitude of the output signal is increased, making necessary the subsequent adjustment of the vertical height controls of the television receiver. It should also be noted that the vertical linearity circuit of Fig. 1 requires the use of an output tube capable of operating over a wide range of conditions with respect to its characteristic response.

Figure 4:
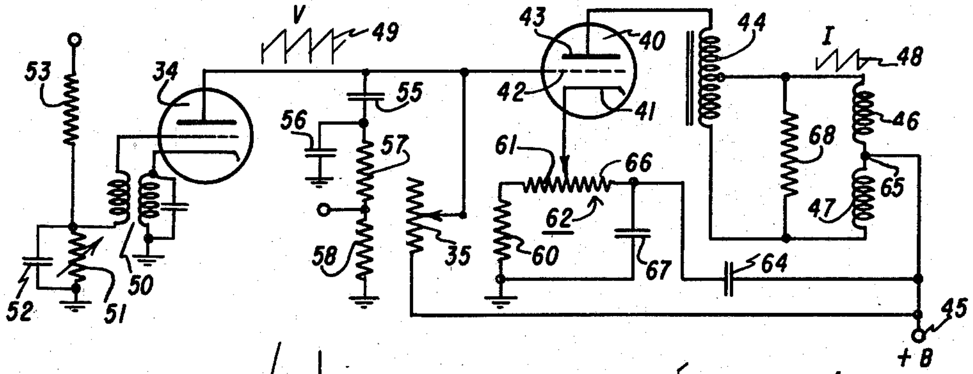
Fig. 4 is a schematic diagram of the improved linearity circuit for a vertical deflection power output stage according to the invention.

With reference to Fig. 4 of the drawings, the improved vertical deflection power output circuit and linearity control of the invention will now be described. The output circuit is comprised of the power output tube 40 having a cathode 41, control grid 42 and plate 43. Plate 43 of the power output tube is connected in series with the vertical output transformer 44 and the B plus terminal 45. The conventional series connected pair of vertical deflection coils 46 and 47 are connected across the output of the vertical power output transformer 44 to be energized by the sawtooth waveform deflection current 48 produced therein.

An input voltage wave of sawtooth waveform 49 is applied to the control grid of the power output tube 40. For this purpose a blocking oscillator is provided including the driver tube 34. The cathode and grid of the tube 34 are coupled to the blocking oscillator transformer 50. The primary of the blocking oscillator transformer is connected to the frequency controlling circuit including adjustable resistor 51 and condenser 52, with the sychronizing pulses being applied thereto through resistor 53. Adjustment of the resistor 51 is effective to control the natural frequency of the blocking oscillator and thereby serves as a vertical hold control for the television receiver.

The plate of the blocking oscillator tube 34 is connected to plus B through variable resistor 35 which controls the voltage swing of the blocking oscillator. Also connected to the plate of the tube 34 is a peaking circuit including condensers 55 and 56 and resistors 57 and 58. Two resistors 57 and 58 are used since the potential at the intermediate point therebetween is used for blanking the picture tube. If this operation is not desired, a single resistor could be used. The peaked sawtooth wave 49 is applied to the grid 42 of tube 40, with the peaking pulse operating to drive the tube beyond cutoff so that retrace movement of the beam is provided without distortion.

In order to provide variable waveform characteristics of the output tube 40, variable bias and degeneration control is provided. Variable bias is provided by fixed resistor 60 and the portion 61 of the potentiometer referred to generally as 62. Variable degeneration is provided by the feedback connection including the condenser 64, connected to the common terminal 65 between the deflection coils 46 and 47, and the portion 66 of the potentiometer 62. Since signals of horizontal frequency may be present in this feedback circuit, bypass condenser 67 is provided to bypass signals of such frequency to ground. It should be noted that the condenser 67 can be much smaller than the condenser 22 of Fig. 1 since the plate circuit for the tube 40 is completed through condenser 64 and the portion 66 of the potentiometer 62, and condenser 67 is not in this circuit. A damping resistor 68 is provided across the vertical deflection coils 46 and 47.

It is therefore seen that a degenerative feedback voltage is applied through condenser 64 and the portion 66 of potentiometer 62 to the cathode 41. As the portion 66 is increased to increase the degenerative feedback, the portion 61 will be decreased to thereby decrease the bias. These actions will tend to compensate each other so that the operating point of the tube 40 will remain substantially fixed and the output current and deflection size will remain substantially constant. There will, however, be a change in the operating characteristics of the tube resulting from the changes in bias and degeneration.

Figure 5:
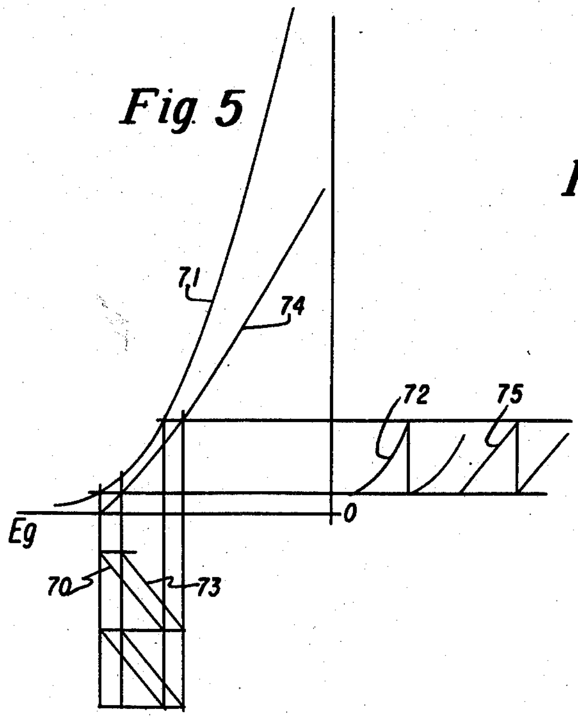
Fig. 5 shows representative dynamic tube characteristic curves which illustrate the improved results obtained with the linearity control circuit of Fig. 4.
Figure 6:
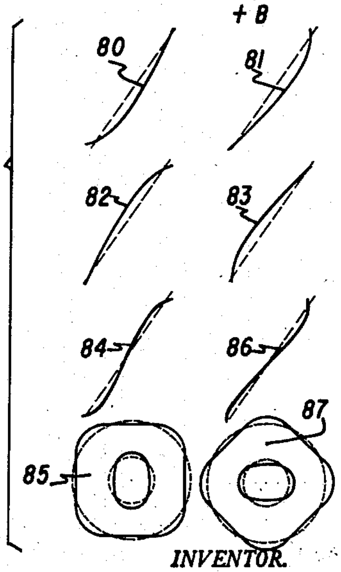
Fig. 6 illustrates the distortion resulting from third harmonic curvature.

In order that the operation of the improved linearity control circuit of Fig. 4 of the drawings may be readily understood, reference is made to Figs. 5 and 6 of the drawings, which show in enlarged and somewhat exaggerated form the operational curves for the output stage. The sawtooth waveform of input voltage 70 as applied to the control grid of the tube 40 while operating with the tube characteristic curve 71 is effective to produce the sawtooth output current waveform 72. Upon adjusting the linearity control potentiometer 62, the sawtooth waveform voltage input signal 73 is applied to a different portion of the tube characteristic curve due to the change in tube bias, while at the same time the tube characteristic curve has been changed to the form shown at 74 due to the tube circuit degeneration changes and the sawtooth waveform of current output is as shown at 75. In the hypothetical example shown by Fig. 5, it will readily be seen that the current outputs 72 and 75 are of substantially the same amplitude but of different waveform. It will also be noted that only a slight change in bias or shift of the operating position of the tube on its characteristic curve is required to obtain the change in linearity of the output current waveform because of the corresponding change in the characteristic operational curve of the tube as a result of the change in degenerative feedback applied thereto. Inasmuch as the current outputs from the power output tube 40 may be substantially the same over the adjustable range of the linearity control and the range of operation of the tube is therefore small, it should be apparent that the output tube may be selected to have operational capacity determined primarily by the required current capacity for the deflection circuit. Thus, the improved circuit enables the use of cheaper and smaller power output tubes.

In addition to the second order curvature of the trace portions of the sawtooth current wave, resulting from tube and transformer characteristics, third harmonic variations may also take place. This is illustrated in Fig. 6 wherein curves 80 and 81 show varying tube characteristics and curves 81 and 83 show varying transformer characteristics. It will be noted that the distortion of the tube, and of the transformer, is in the same direction in both cases shown, yet the waveform is substantially different. By combining waveforms as illustrated in curves 80 and 82, the overall waveform obtained is as shown in curve 84. As indicated at 85, this results in the outer portion of the reproduced picture being a squared circle, and the inner portion of the picture being somewhat elongated vertically. By combining characteristics shown by curves 81 and 83, an overall characteristic is obtained as indicated by curve 86, and this results in picture distortion as indicated at 87. This distortion causes the outer portion of the picture to have a diamond shape and the inner portion to be somewhat elongated horizontally.

Distortions as shown at 85 and 87 are overcome in the present circuit by proper selection of the fixed resistor 60 which forms a part of the bias for the cathode 41 of the tube 40. By changing the value of the fixed resistor 60 the effective change in bias which results from variation of the portion 61 of the potentiometer is thereby changed. It has been found that the operating point of the tube can be thereby controlled so that the third harmonic distortion as illustrated in Fig. 6 is also eliminated. As stated above, this is obtained by proper selection of the fixed resistor 60. Although a single resistance value cannot provide compensation for all different tube and transformer characteristics which might be encountered, it has been found that a single value provides adequate compensation for production tolerances of a given design and construction.

In the foregoing a novel form of vertical deflection power output circuit has been described in which a vertical linearity control providing for a change in tube bias with a corresponding change in degeneration of the tube has been described. With such an arrangement it is possible to obtain a variable control of the tube positive characteristics without substantially increasing or otherwise changing the amplitude of the output signal in order that such positive characteristic of the tube may be readily matched with the negative characteristic of the power output transformer.

The following table of values for circuit elements used in Fig. 4 have been found to give satisfactory operation in one commercial embodiment of the invention which is used to provide vertical deflection of a 17TP4 cathode ray tube having a second anode voltage of 15 kv. These values are to be taken only as an example and the invention is not to be limited thereby.

Tube 34—1 triode section of type 12BH7 tube
Tube 40—1 triode section of type 12BH7 tube
Vertical output transformer 44—turns ratio 44/1; inductance 20,000 ohms at 60 cycles
Vertical deflection coils 46 and 47—3.25 ohms
Condensers 55 and 56—.047 microfarad
Resistor 57—3300 ohms
Resistor 58—1800 ohms
Resistor 35—1-5 megohms
Resistor 60—8700 ohms
Potentiometer 62—750 ohms
Condenser 64—20 microfarads
Condenser 67—30 microfarads
Resistor 68—120 ohms
B plus voltage at terminal 45—450 volts
Voltage at cathode 41—120 volts
Current through plate 43—12 milliamps The value of 8700 ohms for resistor 60 has been found to be effective to cancel the third harmonic component in a system as disclosed having components of the values given above. This permits variations of the characteristics of the tube 40 to compensate for vibrations in the characteristics of the transformer 44 which result from manufacturing tolerances. The use of a greater value of resistance tends to produce a curve as shown at 84, Fig. 6, and the use of a smaller resistance gives a curve as shown at 86. It is to be pointed out, however, that using tubes or transformers of different types may require a different value for the resistor 60.

Although one embodiment of the invention has been disclosed which is illustrative thereof, it is obvious that various changes and modifications can be made therein without departing from the intended scope of the invention as defined in the appended claims.

I claim:

1. In a television receiver having a magnetically deflected picture tube, the vertical deflection system including in combination, a pair of series connected vertical deflection coils, a vertical deflection power output transformer having input and output terminals, a power output tube having cathode, grid and plate electrodes, means applying a vertical deflection input voltage across the grid and cathode electrodes of said tube, means connecting the plate electrode of said tube with the input terminals of said transformer, means connecting the output terminal of said transformer with said deflection coils to cause a deflection current to flow therein in accordance with the waveform of said input deflection voltage, linearity control means providing a combined adjustable bias and adjustable degeneration control for said tube, said linearity control means including a potentiometer having a pair of fixed terminal ends and an adjustable tap connected to said cathode electrode, resistance means connected to one fixed terminal end of said potentiometer and to a reference potential and forming with said potentiometer an adjustable cathode bias resistance for said tube, a negative feedback condenser connected between said series connected deflection coils and the other fixed terminal end of said potentiometer, whereby adjustment of said potentiometer tap causes a simultaneous change of bias and degeneration for said tube in a manner to vary the waveform of output current in said deflection coils.

2. A magnetic deflection system for providing vertical deflection of the beam of a cathode ray tube in a television receiver including in combination, an amplifier tube having a control grid and output electrodes, said amplifier tube having such characteristics to impart a positive curvature to the trace portions of the output sawtooth current wave thereof with respect to the sawtooth voltage wave applied to the control grid thereof, a transformer coupled to said output electrodes of said amplifier tube and providing a sawtooth current wave for deflection, said transformer having such characteristics to impart a negative curvature to the trace portions of the sawtooth current wave applied therethrough, circuit means for providing variable bias and degeneration to said amplifier tube for controlling the curvature imparted to the trace portions of the output sawtooth current wave thereof to substantially cancel the second harmonic content of the negative curvature imparted thereto by said transformer, said circuit means including feedback condenser means and adjustable resistance means connected in series, with said adjustable resistance means simultaneously controlling the bias and degeneration applied to said amplifier tube in opposite senses so that the attending changes in amplitude tend to cancel each other and changes of curvature are provided without substantial changes in amplitude, and fixed biasing means preset at a predetermined value to control said amplifier tube characteristics for substantially canceling the third harmonic content of the curvature of the current wave in said transformer.

3. A magnetic deflection system for a cathode ray tube including in combination, a blocking oscillator, a power output circuit, and deflection coil means about a portion of the tube, said power output circuit including an amplifier tube having output electrodes and a control grid and a transformer having input and output terminals, said input terminals of said transformer being coupled to said output electrodes of said amplifier tube and said output terminals thereof being connected to said deflection coil means, said blocking oscillator being connected to said control grid and applying a peaked sawtooth voltage wave thereto for providing a sawtooth current wave in the output electrodes thereof, said transformer imparting a negative curvature to the trace portions of the sawtooth current wave applied therethrough, said amplifier imparting a positive curvature to said trace portion of the output current wave thereof with respect to the voltage wave applied to the control grid thereof, and a linearity circuit including feedback condenser means coupled to said transformer, fixed bias means, and a potentiometer having end terminals connected to said feedback condenser means and said fixed biasing means respectively and an adjustable tap connected to said amplifier tube for providing variable bias and degeneration to said amplifier tube for controlling the curvature imparted to said trace portions of said sawtooth current wave thereby to substantially eliminate the second harmonic content of the current in said deflection coil means, said fixed biasing means being preset at a predetermined value for substantially eliminating the third harmonic content of said deflection coil current.

4. A magnetic deflection system for a cathode ray tube including in combination, a blocking oscillator, a power output circuit, deflection coil means about a portion of the tube, said output circuit including an amplifier tube having a cathode, an anode and a control grid, and a transformer having input and output terminals, said input terminal of said transformer being connected to said anode of said amplifier tube and said output terminal thereof being connected to said deflection coil means, said blocking oscillator including an electron tube having the anode thereof directly connected to said control grid of said amplifier tube and applying a peaked sawtooth voltage wave thereto for providing a sawtooth current wave in said anode thereof, said transformer imparting a negative curvature to the trace portions of the sawtooth current wave applied therethrough, said amplifier imparting a positive curvature to the anode current thereof with respect to the voltage wave applied to the control grid thereof, and means for controlling the characteristics of said amplifier tube including a potentiometer having end terminals and an adjustable tap connected to said cathode of said tube, condenser means connected between one end terminal of said potentiometer and said deflection coil means for providing variable degenerative feedback for said tube, fixed resistor means connected between the other end terminal of said potentiometer and ground for providing bias for said amplifier tube, movement of said tap on said potentiometer changing the bias and degeneration of said amplifier tube for controlling the characteristics thereof to substantially cancel the second harmonic content of the curvature of the current in said deflection coil means, said fixed resistor means having a predetermined value such that the third harmonic content of said deflection coil current is substantially canceled.

5. A magnetic deflection system for a cathode ray tube including in combination, an amplifier tube having a cathode, an anode and a control grid, a transformer having input and output terminals, said input terminal of said transformer being connected to said anode of said amplifier tube and said output terminals thereof providing a sawtooth current wave for deflection, means for applying a peaked sawtooth voltage wave to said control grid of said tube, said amplifier imparting a positive curvature to the anode current thereof with respect to the voltage wave applied to the control grid thereof, said transformer imparting a negative curvature to the trace portions of the sawtooth current wave applied therethrough, and means for controlling the characteristics of said amplifier tube including a potentiometer having end terminals and an adjustable tap connected to said cathode of said tube, a degenerative feedback circuit including condenser means connected to one end of said potentiometer, fixed resistor means connected between the other end terminal of said potentiometer and ground for providing bias for said amplifier tube, movement of said tap on said potentiometer changing the bias and degeneration of said amplifier tube for controlling the characteristics thereof to substantially cancel the second harmonic content of the curvature of the current in said deflection coil means without substantially changing the amplitude thereof, said fixed resistor means having a predetermined value such that the third harmonic content of said deflection coil current is substantially canceled.

6. A deflection system for providing a sawtooth current wave at a frequency of substantially 60 cycles per second for electromagnetic vertical deflection of the cathode ray beam in a television receiver, said deflection system including in combination, a deflection power output circuit including an electron tube having anode, cathode and grid electrodes, means for applying a negatively peaked sawtooth voltage wave to said grid electrode, a deflection transformer connected to said anode of said electron tube, said tube providing a sawtooth current wave in said transformer in response to the sawtooth voltage wave applied to said grid electrode thereof, and a linearity control circuit connected to said electrodes of said tube including means coupled to said cathode for providing an adjustable bias therefor and means including a feedback condenser interconnecting said transformer and said cathode providing adjustable degenerative feedback to said tube for controlling the waveform of the trace portions of said sawtooth current wave in said transformer, said linearity control circuit including a single movable means for simultaneously adjusting said bias on said cathode and said degenerative feedback to thereby vary the waveform of the trace portions of said sawtooth current wave in said transformer, with adjustment of said movable means causing changes in cathode bias and degenerative feedback which produce changes in the amplitude of said sawtooth current wave which are of opposite sense and tend to cancel each other.

7. A deflection system for providing a sawtooth current wave at a frequency of substantially 60 cycles per second for electromagnetic vertical deflection of the cathode ray beam in a television receiver, said system including in combination, a deflection power output circuit including an electron amplifier tube having anode, cathode and grid electrodes, means for applying a negative peaked sawtooth voltage wave to said grid electrode, a deflection transformer connected to said anode of said electron tube, said amplifier tube providing a sawtooth current wave in said transformer in response to the sawtooth voltage wave applied to said grid electrode thereof, with said tube imparting a positive curvature to the trace portions of the sawtooth wave at the anode thereof, said transformer having such characteristics to impart a negative curvature to the trace portions of the sawtooth wave therein, and a linearity control circuit connected to said electrodes of said tube including means coupled to said cathode for providing an adjustable bias therefor and means including a feedback condenser interconnecting said transformer and said cathode providing adjustable degenerative feedback to said tube for controlling the curvature of said trace portions, said linearity control circuit including a single movable means for simultaneously controling said cathode bias and said degenerative feedback, so that the effective characteristics of said amplifier tube may be adjusted to substantially compensate for the characteristics of said transformer and the trace portions of the current wave in said transformer are substantially linear, with adjustment of said movable means causing changes in cathode bias and degenerative feedback which produce changes in the amplitude of said sawtooth current wave which are of opposite sense and tend to cancel each other.

8. A deflection system for providing vertical deflection of the beam of an electromagnetically deflected cathode ray tube in a television receiver, said deflection system including in combination, an electron valve having anode, cathode and grid electrodes, means for applying a sawtooth voltage wave to said grid electrode, an inductive output circuit connected to said anode electrode of said valve including deflection coil means in which a sawtooth current wave is developed positioned adjacent the cathode ray tube, said valve having such characteristics to impart a positive curvature to the trace portions of said sawtooth current wave and said output circuit imparting a negative curvature thereto, condenser means having a first end terminal connected to said output circuit, a second end terminal connected to a reference potential and an intermediate terminal, means for developing a direct current potential across said condenser means which is positive at said first end terminal, resistance means connected between said intermediate terminal of said condenser means and said reference potential, and means connecting said resistance means to said cathode electrode of said valve for applying thereto a bias voltage and a degenerative feedback voltage from said condenser means, said last named means simultaneously controlling the amount of degenerative feedback applied to said cathode and also the amount of bias on said cathode and thereby controlling the curvature imparted to said trace portions of said sawtooth current wave by said valve and being selected so that the curvature effect of said valve compensates for the curvature effect of said output circuit, with said cathode bias and said degenerative feedback producing opposite effects on the amplitude of said sawtooth current wave which tend to cancel each other.

9. A deflection system for providing vertical deflection of the beam of an electromagnetically deflected cathode ray tube in a television receiver, said deflection system including in combination, an electron valve, means for applying a sawtooth voltage wave to said valve, an output circuit connected to said valve including deflection coil means in which a sawtooth current wave is developed positioned adjacent the cathode ray tube, condenser means having first and second end terminals and an intermediate terminal, said first end terminal being connected to said output circuit and said second end terminal being connected to a reference potential so that said condenser means provides a path for the alternating current in said output circuit, means for developing a direct current potential across said condenser means which is positive at said first end terminal, resistance means having first and second end terminals and an adjustable tap thereon, with said first end terminal of said resistance means being connected to said intermediate terminal of said condenser means, said second end terminal thereof being connected to said reference potential, and said adjustable tap being connected to said valve for applying thereto a bias voltage and a degenerative feedback voltage from said condenser means, said adjustable tap being movable to adjust the degenerative feedback applied to said tube from said condenser means and to simultaneously adjust the bias on said tube in the opposite sense.

10. A deflection system for providing vertical deflection of the beam of an electromagnetically deflected cathode ray tube in a television receiver, said deflection system including in combination, an electron valve having anode, cathode and grid electrodes, means for applying a negatively peaked sawtooth voltage wave to said grid electrode, an output circuit connected to said anode electrode including deflection coil means positioned adjacent the cathode ray tube in which a sawtooth current wave is developed, condenser means having a first end terminal connected to said output circuit, a second end terminal connected to a reference potential and an intermediate terminal, means for developing a direct current potential across said condenser means which is positive at said first end terminal, a potentiometer having first and second end terminals and an adjustable tap, with said first end terminal being connected to said intermediate terminal of said condenser means and said tap being connected to said cathode of said valve, and fixed resistance means connecting said second end terminal of said potentiometer to said reference potential, said adjustable tap being movable to adjust the degenerative feedback applied to said cathode from said condenser means and to simultaneously adjust the bias on said cathode in the opposite sense, with said fixed resistance means providing a fixed component to the bias on said cathode.

11. A deflection system for providing vertical deflection of the beam of an electromagnetically deflected cathode ray tube in a television receiver, said deflection system including in combination, sawtooth wave developing means including first condenser means having a first terminal connected to a reference potential and a second terminal, means connected to said second terminal for charging said condenser means, a first electron valve connected to said condenser means for periodically discharging the same so that a sawtooth voltage wave is developed across said condenser means, first resistance means connected across a portion of said condenser means for negatively peaking the sawtooth voltage wave and for altering the linearity of the trace portions of the wave, and electromagnetic field producing means including a second electron valve having anode, cathode and grid electrodes, said grid electrode being directly connected to said second terminal of said first condenser means so that the negatively peaked sawtooth voltage wave developed thereacross is applied to said grid electrode, an output circuit connected to said anode electrode including deflection coil means positioned adjacent the cathode ray tube in which a sawtooth current wave is developed, second condenser means including a first end terminal connected to said output circuit, a second end terminal connected to said reference potential and an intermediate terminal, means for developing a direct current potential across said second condenser means which is positive at said first end terminal, and second resistance means connected between said intermediate terminal and said reference potential and including a tap adjustably positioned thereon and connected to said cathode electrode of said second valve, said adjustable tap being movable to adjust the degenerative feedback applied to said cathode from said second condenser means and to simultaneously adjust the bias on said cathode in the opposite sense.

12. A deflection system for providing vertical deflection of the beam of an electromagnetically deflected cathode ray tube in a television receiver, said deflection system including in combination, sawtooth wave developing means including first condenser means having a first terminal connected to a reference potential and a second terminal, means connected to said second terminal for charging said first condenser means, a first electron valve connected to said condenser means for periodically discharging the same so that a sawtooth voltage wave is developed across said first condenser means, first resistance means connected across a portion of said first condenser means for negatively peaking the sawtooth voltage wave and for altering the linearity of the trace portions of the wave, and electromagnetic field producing means including, a second electron valve having anode, cathode and grid electrodes, said grid electrode being directly connected to said second terminal of said first condenser means so that the negatively peaked sawtooth voltage wave developed thereacross is applied to said grid electrode, an inductive output circuit connected to said anode electrode including deflection coil means positioned adjacent the cathode ray tube in which a sawtooth current wave is developed, second condenser means including first and second end terminals and an intermediate terminal, said first end terminal being connected to said output circuit and said second end terminal connected to said reference potential so that said second condenser means provides a path for alternating current in said output circuit, means for developing a direct current potential across said second condenser means which is positive at said first end terminal, a potentiometer having first and second end terminals and an adjustable tap, with said first end terminal being connected to said intermediate terminal of said second condenser means and said tap being connected to said cathode electrode of said second valve, and fixed resistance means connecting said second end terminal of said potentiometer to said reference potential, said adjustable tap being movable to adjust the degenerative feedback applied to said cathode from said second condenser means and to simultaneously adjust the bias on said cathode, with said fixed resistance means providing a fixed component to the bias on said cathode.

GEORGE W. FYLER.

References Cited in the file of this patent

UNITED STATES PATENTS

| Number | Name | Date |
|---|---|---|
| 2,077,574 | Marloff | Apr. 20, 1937 |
| 2,093,177 | Vance | Sept. 14, 1937 |
| 2,280,733 | Tolson | Apr. 21, 1942 |
| 2,296,727 | Moore | Sept. 22, 1942 |
| 2,370,426 | Schade | Feb. 27, 1945 |
| 2,391,082 | Beste | Dec. 18, 1945 |
| 2,414,546 | Nagel | Jan. 21, 1947 |
| 2,440,786 | Schade | May 4, 1948 |
| 2,440,895 | Cawein | May 4, 1948 |
| 2,466,784 | Schade | Apr. 12, 1949 |
| 2,562,985 | Kronenberg | Aug. 7, 1951 |
| 2,579,627 | Tourshou | Dec. 25, 1951 |
| 2,599,629 | Grimm et al. | June 10, 1952 |
| 2,621,309 | Faudell | Dec. 9, 1952 |